United States Patent
Kim et al.

(10) Patent No.: US 9,796,380 B2
(45) Date of Patent: Oct. 24, 2017

(54) APPARATUS AND METHOD FOR CONTROLLING UN-PARKING OF A VEHICLE

(71) Applicant: HYUNDAI MOTOR COMPANY, Seoul (KR)

(72) Inventors: Young Bin Kim, Seoul (KR); Jin Ho Park, Hwaseong-si (KR); Joo Woong Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 145 days.

(21) Appl. No.: 14/567,543

(22) Filed: Dec. 11, 2014

(65) Prior Publication Data
US 2016/0075325 A1   Mar. 17, 2016

(30) Foreign Application Priority Data
Sep. 11, 2014   (KR) ........................ 10-2014-0120201

(51) Int. Cl.
| | | |
|---|---|---|
| *G01C 22/00* | (2006.01) | |
| *G05D 1/00* | (2006.01) | |
| *B60W 30/06* | (2006.01) | |
| *B60W 40/02* | (2006.01) | |
| *B62D 15/00* | (2006.01) | |
| *B62D 15/02* | (2006.01) | |
| *G05D 3/00* | (2006.01) | |
| *G06F 7/00* | (2006.01) | |
| *G06F 17/00* | (2006.01) | |
| *A01B 69/00* | (2006.01) | |
| *B62D 6/00* | (2006.01) | |
| *B62D 11/00* | (2006.01) | |
| *B62D 12/00* | (2006.01) | |

(Continued)

(52) U.S. Cl.
CPC ............ *B60W 30/06* (2013.01); *B60W 40/02* (2013.01); *B62D 15/00* (2013.01); *B62D 15/0285* (2013.01); *B60W 2050/0077* (2013.01); *B60W 2550/10* (2013.01); *G06F 3/048* (2013.01); *G06F 17/00* (2013.01)

(58) Field of Classification Search
CPC .... B60W 30/06; B62D 15/0285; G06F 17/00; G06F 3/048
USPC ........................................ 701/23, 41, 1, 300
See application file for complete search history.

(56) References Cited

U.S. PATENT DOCUMENTS

| | | | | |
|---|---|---|---|---|
| 2002/0055811 | A1* | 5/2002 | Obradovich | ........ B60R 16/0231 |
| | | | | 701/23 |
| 2008/0033647 | A1* | 2/2008 | Milark | .................... G01S 15/18 |
| | | | | 701/300 |

(Continued)

FOREIGN PATENT DOCUMENTS

| | | | |
|---|---|---|---|
| JP | 2006-528106 A | 12/2006 | |
| JP | WO 2011128965 A1 * | 10/2011 | ............... B62D 1/00 |

(Continued)

OTHER PUBLICATIONS

English Translation for WO2011/128965A1.*

*Primary Examiner* — Mahmoud Ismail
(74) *Attorney, Agent, or Firm* — McDermott Will & Emery LLP (57) ABSTRACT

An apparatus for controlling un-parking of a vehicle includes: a sensor module configured to include at least one sensor that receives an un-parking request signal for a parked vehicle and determines whether a first object around the vehicle is present; and a control module configured to determine a position of a second object based on the un-parking request signal and determine whether the vehicle is un-parked depending on positions of the first object and of the second object to control the un-parking of the vehicle.

13 Claims, 8 Drawing Sheets

(51) Int. Cl.
    *B63G 8/20*     (2006.01)
    *B63H 25/04*     (2006.01)
    *G06F 19/00*     (2011.01)
    *G05D 1/02*     (2006.01)
    *G06F 17/10*     (2006.01)
    *G06G 7/78*     (2006.01)
    *B60W 50/00*     (2006.01)
    *G06F 3/048*     (2013.01)

(56) References Cited

U.S. PATENT DOCUMENTS

| | | | | |
|---|---|---|---|---|
| 2011/0054739 | A1* | 3/2011 | Bammert | B62D 15/0285 |
| | | | | 701/41 |
| 2013/0073119 | A1* | 3/2013 | Huger | B62D 15/027 |
| | | | | 701/1 |
| 2014/0200769 | A1* | 7/2014 | Noh | B62D 15/0285 |
| | | | | 701/41 |

FOREIGN PATENT DOCUMENTS

| | | |
|---|---|---|
| KR | 2012-0094366 A | 8/2012 |
| KR | 2013-0028183 A | 3/2013 |
| KR | 2013-0126168 A | 11/2013 |
| KR | 10-2014-0074343 A | 6/2014 |
| WO | 2009/121534 A1 | 10/2009 |

* cited by examiner

APPARATUS AND METHOD FOR CONTROLLING UN-PARKING OF A VEHICLE

CROSS-REFERENCE TO RELATED APPLICATION

This application is based on and claims the benefit of priority to Korean Patent Application No. 10-2014-0120201, filed on Sep. 11, 2014 in the Korean Intellectual Property Office, the disclosure of which is incorporated herein in its entirety by reference.

TECHNICAL FIELD

The present disclosure relates to an apparatus and a method for controlling un-parking of a vehicle, and more particularly, to an apparatus and a method for controlling un-parking of a vehicle capable of confirming a position of a driver from a position of a manipulation device and un-parking a parked vehicle based on the position of the driver.

BACKGROUND

Recently, a technology of guiding parking and un-parking of a vehicle by confirming environment around the vehicle in an automatic parking assistance system by equipping the automatic parking assistance system in the vehicle has been developed. The automatic parking assistance system may guide a control of a steering angle to assist parking or un-parking when a vehicle is parked or un-parked in or from a specific parking space.

However, in the case of controlling the un-parking using the automatic parking assistance system, a sensing accuracy of objects present around a vehicle is degraded and thus a collision may occur during the un-parking.

SUMMARY

The present disclosure has been made to solve the above-mentioned problems occurring in the prior art while advantages achieved by the prior art are maintained intact.

An aspect of the present disclosure provides an apparatus and a method for controlling un-parking of a vehicle and capable of confirming objects around the vehicle using at least one sensor equipped in the vehicle and confirming a position of a driver based on a position of a manipulation device generating an un-parking request signal to control un-parking of the parked vehicle.

According to an exemplary embodiment of the present disclosure, an apparatus for controlling un-parking of a vehicle includes a sensor module configured to include at least one sensor that receives an un-parking request signal for a parked vehicle and confirms whether first objects around the vehicle are present; and a control module configured to confirm a position of a second object based on the un-parking request signal and confirm whether the vehicle is un-parked depending on positions of the first object and the second object to control the un-parking of the vehicle.

The second object may be positioned outside the vehicle to trigger a generation of the un-parking request signal.

The control module is configured to confirm the position of the second object based on a receiving time of the un-parking request signal received by the at least one sensor.

The control module is configured to set an un-parking mode including an un-parking kind for a left front, a left rear, a right front, and a right rear, respectively, depending on an un-parking method that is right angled un-parking and parallel un-parking of the vehicle, based on the positions of the first object and second object.

The control module is configured to calculate an un-parking trace of the vehicle based on the positions of the first object and the second object and the un-parking mode.

The control module is configured to confirm distances from a side of the vehicle and the first object and confirm distances from a rear wheel of the vehicle and a front corner of the first object to calculate the un-parking trace of the vehicle, when an un-parking mode is set as any one of a right angled left front and a right angled right front.

The control module is configured to confirm distances from a side of the vehicle and the first object and confirm distances from a rear wheel of the vehicle and a rear corner of the first object to calculate the un-parking trace of the vehicle, when an un-parking mode is set as any one of a right angled left rear and a right angled right rear.

The control module is configured to control a steering angle and a speed of the vehicle depending on the un-parking trace to perform the un-parking of the vehicle.

According to another exemplary embodiment of the present disclosure, a method for controlling un-parking of a vehicle includes receiving an un-parking request signal for a parked vehicle; confirming whether a first object around the vehicle is present; confirming a position of a second object based on the un-parking request signal; confirming whether the vehicle is un-parked depending on the positions of the first object and the second object; and performing the un-parking of the vehicle.

The receiving of the un-parking request signal may include receiving an un-parking request signal generated from the second object positioned outside the vehicle.

The confirming of the position of the second object may include confirming a receiving time of the un-packing request signal received by at least one sensor and confirming the position of the second object based on the receiving time.

The confirming whether the vehicle is parked may include setting an un-parking mode including an un-parking kind for a left front, a left rear, a right front, and a right rear, respectively, depending on an un-parking method which is right angled un-parking and parallel un-parking of the vehicle based on the positions of the first and second objects.

The performing of the un-parking of the vehicle may further include calculating an un-parking trace of the vehicle based on the positions of the first object and the second object and the un-parking mode.

The calculating of the un-parking trace of the vehicle may include confirming distances from a side of the vehicle and the first object and confirming distances from a rear wheel of the vehicle and a front corner of the first object to calculate the un-parking trace of the vehicle, when an un-parking mode is set as any one of a right angled left front and a right angled right front.

The calculating of the un-parking trace of the vehicle may include confirming distances from a side of the vehicle and the first object and confirming distances from a rear wheel of the vehicle and a rear corner of the first object to calculate the un-parking trace of the vehicle, when an un-parking mode is set as any one of a right angled left rear and a right angled right rear.

The performing of the un-parking of the vehicle may include controlling a steering angle and a speed of the vehicle depending on the un-parking trace to perform the un-parking of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, various exemplary embodiments of the present disclosure will be described with reference to the accompanying drawings. The exemplary embodiments of the present disclosure may be variously changed and variously practiced, but specific exemplary embodiments are illustrated in the accompanying drawings and detailed contents thereof will be described. However, it is to be understood that various exemplary embodiments of the present disclosure are not limited to the specific exemplary embodiments, but includes all modifications, equivalents, and substitutions included in the spirit and the scope of the present disclosure. In describing the drawings, like components are denoted by like reference numerals.

Figure 1:
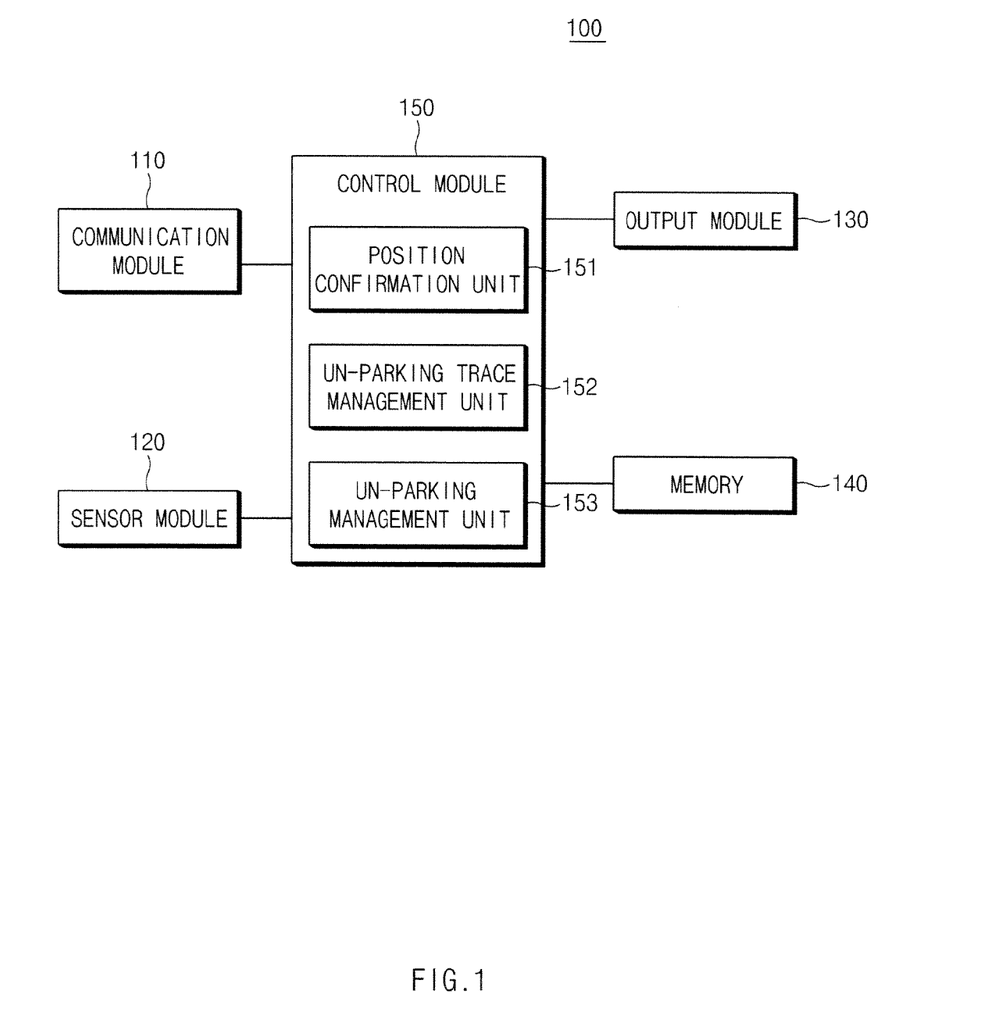
FIG. 1 is a block diagram illustrating a main configuration of an apparatus for controlling un-parking of a vehicle according to an exemplary embodiment of the present disclosure.
Figure 2:
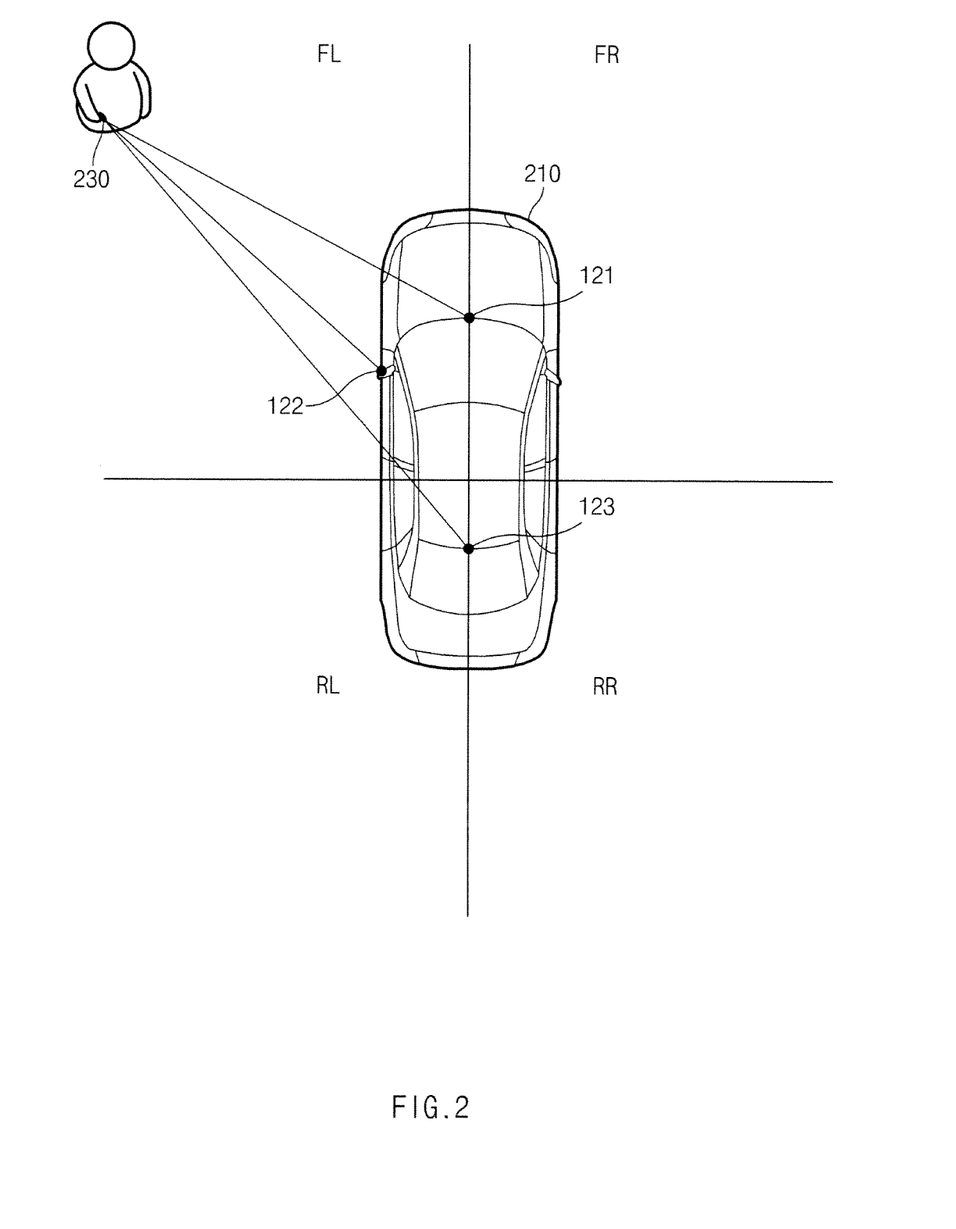
FIG. 2 is a diagram for describing a method for confirming a position of a driver at the time of un-parking of a vehicle according to an exemplary embodiment of the present disclosure.
Figure 3A:
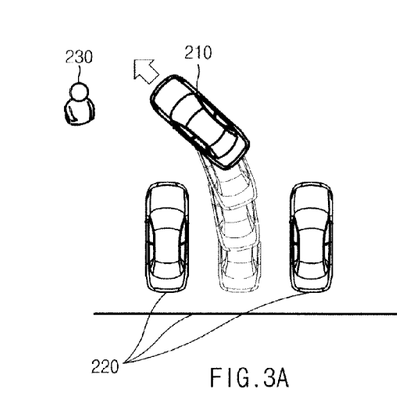
FIGS. 3A to 3F are diagrams for describing a kind of un-parking modes of a vehicle according to an exemplary embodiment of the present disclosure.
Figure 3B:
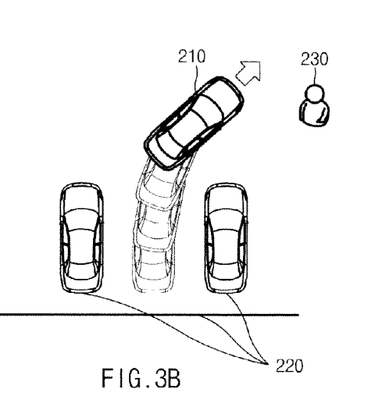
Figure 3C:
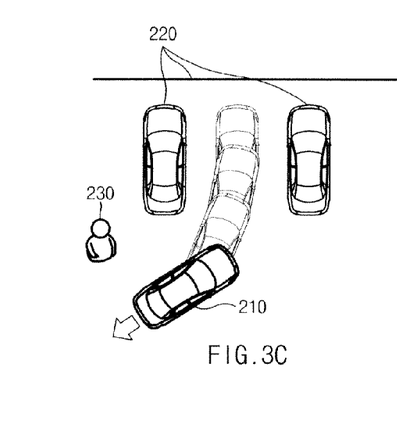
Figure 3D:
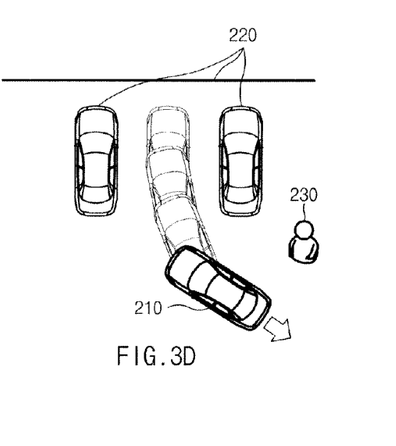
Figure 3E:
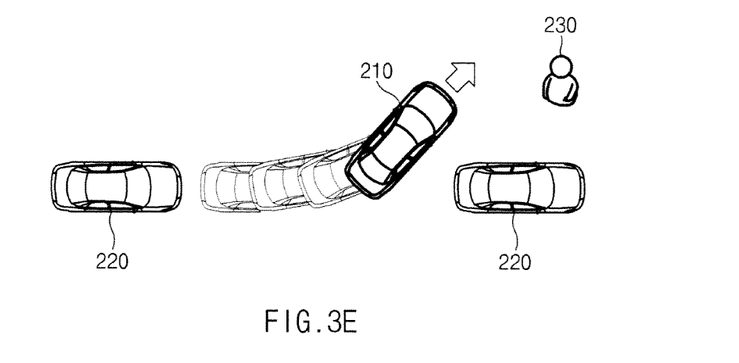
Figure 3F:
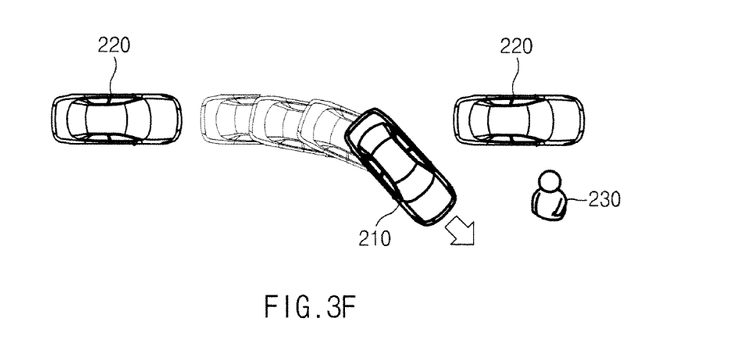
Figure 4A:
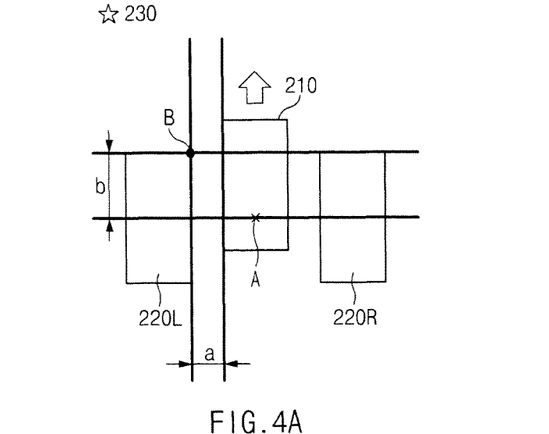
FIGS. 4A to 4C are block diagrams for describing a method for generating an un-parking trace for un-parking a vehicle in a right angled left front according to an exemplary embodiment of the present disclosure.
Figure 4B:
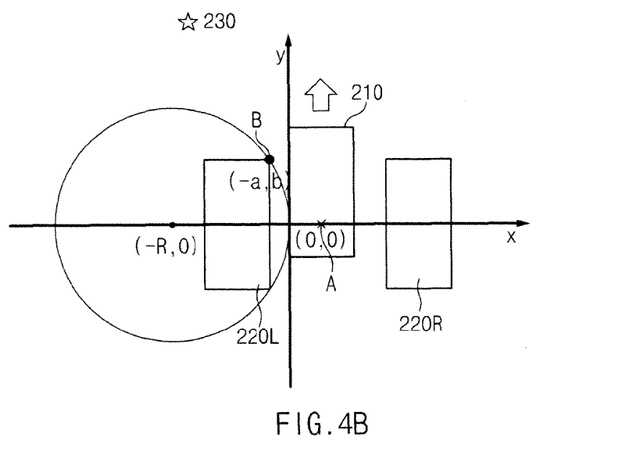
Figure 4C:
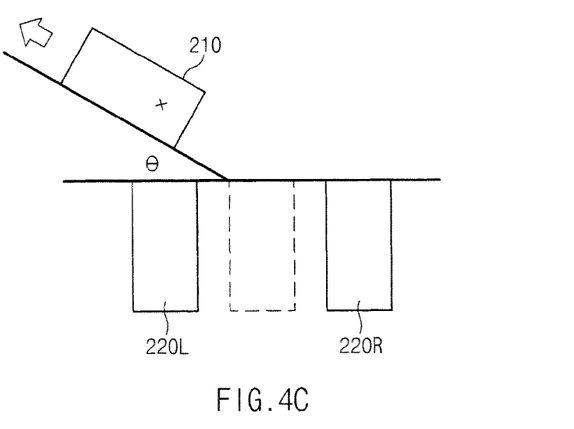
Figure 5A:
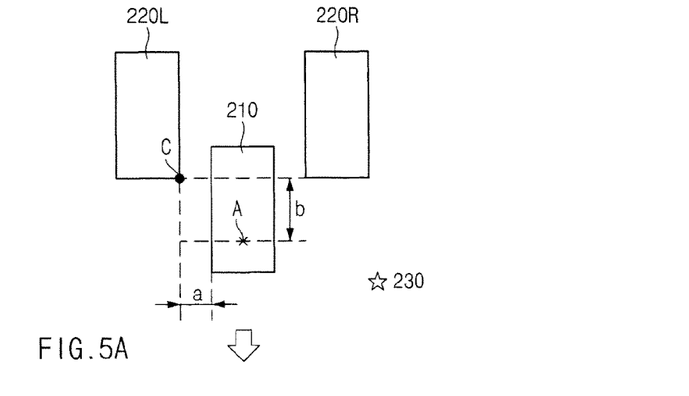
FIGS. 5A to 5C are block diagrams for describing a method for generating un-parking trace for un-parking a vehicle in a right angled right rear according to an exemplary embodiment of the present disclosure.
Figure 5B:
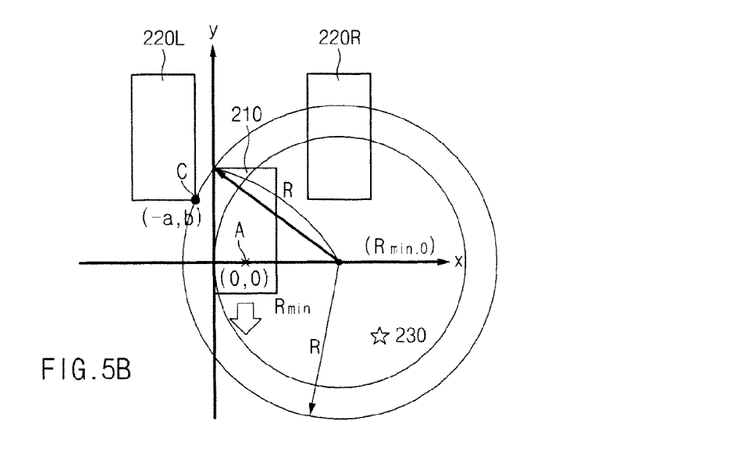
Figure 5C:
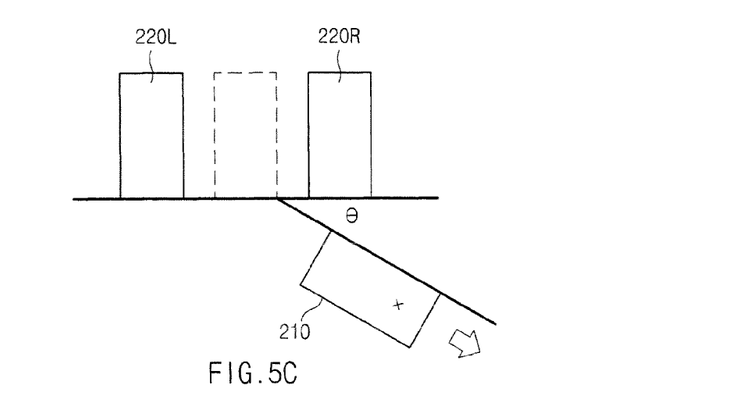
Figure 6A:
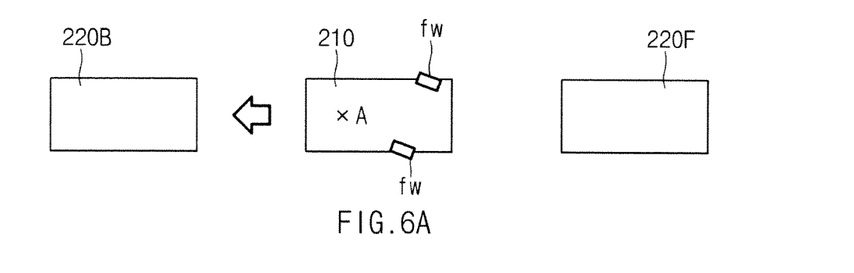
FIGS. 6A to 6C are block diagrams for describing a method for generating an un-parking trace for un-parking a vehicle in a parallel left front according to an exemplary embodiment of the present disclosure.
Figure 6B:
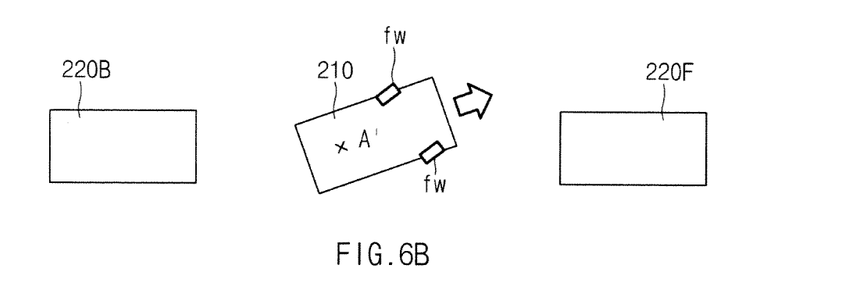
Figure 6C:
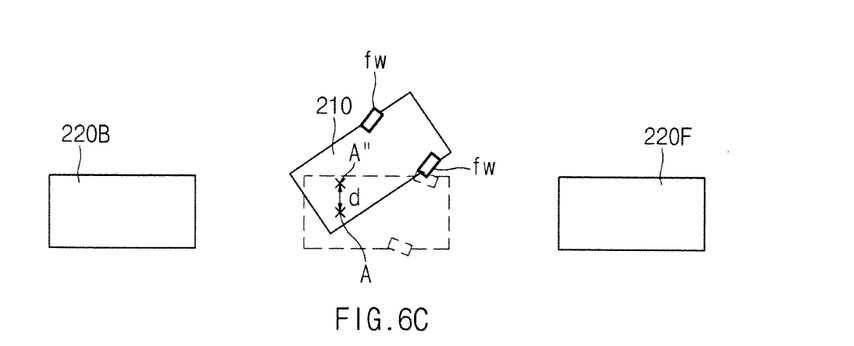

FIG. 1 is a block diagram illustrating a main configuration of an apparatus for controlling un-parking of a vehicle according to an exemplary embodiment of the present disclosure. FIG. 2 is a diagram for describing a method for confirming a position of a driver at the time of un-parking of a vehicle according to an exemplary embodiment of the present disclosure. FIGS. 3A to 3F are diagrams for describing a kind of un-parking modes of a vehicle according to an exemplary embodiment of the present disclosure. FIGS. 4A to 4C are block diagrams for describing a method for generating an un-parking trace for un-parking a vehicle in a right angled left front according to an exemplary embodiment of the present disclosure. FIGS. 5A to 5C are block diagrams for describing a method for generating an un-parking trace for un-parking a vehicle in a right angled right rear according to an exemplary embodiment of the present disclosure. FIGS. 6A to 6C are block diagrams for describing a method for generating an un-parking trace for un-parking parking a vehicle in a parallel left front according to an exemplary embodiment of the present disclosure.

Referring to FIGS. 1 to 6, an apparatus 100 for controlling un-parking of a vehicle according to an exemplary embodiment of the present disclosure is configured to confirm a position of a driver based on positions of manipulation devices, for example, a smart key, a smart phone, and the like, which may remotely manipulate a vehicle and un-park a parked vehicle based on the position of the driver. Accordingly, in an exemplary embodiment of the present disclosure, the apparatus 100 for controlling un-parking of a vehicle includes a communication module 110, a sensor module 120, an output module 130, a memory 140, and a control module 150.

The communication module 110 is configured to perform various intra-vehicle communications such as a controller area network (CAN), a CAN with flexible data rate (CAN-FD), a FlexRay, a media oriented systems transport (MOST), and a time triggered Ethernet (TT Ethernet) for communication among the sensor module 120, the output module 130, the memory 140, and the control module 150.

The sensor module 120 may include at least one ultrasonic sensor (not shown) for sensing at least one first object present around a vehicle, at least one radio frequency (RF) receiving sensor (not shown) for receiving an un-parking request signal for the parked vehicle from a manipulation device (hereinafter, referred to as a second object), at least one steering angle sensor (not shown) for confirming a steering angle of a vehicle, and the like. The sensor module 120 may provide at least one sensing signal acquired from a plurality of sensors to the control module 150 through the communication module 110.

When the parked vehicle may not be un-parked, the output module 130 may include a speaker (not shown) through which no un-parking informing message may be output by a control of the control module 150. Although not illustrated, when the vehicle may not be un-parked, the apparatus 100 for controlling un-parking of a vehicle may include at least one lamp, which is turned on and off in a predetermined pattern by the control of the control module 150.

The memory 140 may store programs, and the like for running the apparatus 100 for controlling un-parking of a vehicle. In particular, the memory 140 may store programs, and the like, which may execute a direction confirmation of a second object, an un-parking trace calculation of a vehicle, and the like, based on a receiving time of an RF signal received from the second object, for example, the un-parking request signal.

When the un-parking request signal received from the sensor module 120 is received, the control module 150 is configured to sense at least one first object present around the vehicle and confirm the position of the second object depending on the un-parking request signal. The control module 150 confirms whether the vehicle may be un-parked depending on the confirmed positions of the first object and the second object to be able to control the un-parking of the vehicle. Accordingly, in an exemplary embodiment of the present disclosure, the control module 150 is configured to include a position confirmation unit 151, an un-parking trace management unit 152, and an un-parking management unit 153.

The position confirmation unit 151 is configured to receive the un-parking request signal for the parked vehicle through the RF receiving sensor included in the sensor module 120. Upon receiving the un-parking request signal, the position confirmation unit 151 activates the ultrasonic sensor included in the sensor module 120 to be able to confirm the position of at least one first object present around the parked vehicle. In this case, the first object may mean objects such as other vehicles, a road hump, and the like, other than the parked vehicle. The position confirmation unit 151 communicates with a vehicle through, for example, the smart key, the smart phone, and the like, which provide the un-parking request signal to be able to confirm the position of the second object, which is a manipulation device capable of remotely manipulating the vehicle. Generally, the manipulation device is carried and manipulated by a driver and therefore the position of the second object may mean a position where the driver manipulates the second object.

According to an exemplary embodiment of the present disclosure, the position confirmation unit 151 is configured to confirm the position of the second object 230 by the method as illustrated in FIG. 2. The driver may operate the second object 230 at any one of a front left (FL) position, a front right (FR) position, a rear left (RL) position, and a rear right (RR) position based on a vehicle 210. The RF receiving sensor receiving the vehicle un-parking request signal that is the RF signal from the second object 210 may be a first RF sensing unit disposed at a front center 121, a second RF sensing unit disposed at a front left 122, and a third RF sensing disposed at a rear center 123 of the vehicle 210. For example, when a driver manipulates the second object 230, the position confirmation unit 151 may confirm a time t1 at which the un-parking request signal is received by the first RF sensing unit of the RF receiving sensor positioned at the front center 121 and confirm a time t2 at which the un-parking request signal is received by the second RF sensing unit of the RF receiving sensor positioned at the front left 122. When t1−t2 is smaller than 0, the position confirmation unit 151 may estimate that the second object 230 is positioned at the left of the vehicle and when t1−t2 is larger than 0, may estimate that the second object 230 is positioned at the right of the vehicle 210. The position confirmation unit 151 may confirm a receiving time t3 of the third RF sensing unit of the RF receiving sensor positioned at the rear center 123 of the vehicle 210. When t2−t3 is smaller than 0, the control module 150 may estimate that the second object 230 is positioned at the front of the vehicle 210 and when t2−t3 is larger than 0, estimate that the second object 230 is positioned at the rear of the vehicle 210. Further, it is to be noted that the RF receiving sensor is not necessarily limited to having only three RF sensing units, each of which is positioned at the front center 121, at the front left 122, and at the rear center 123 of the vehicle 210.

The un-parking trace management unit 152 is configured to generate an un-parking trace of the vehicle 210 based on the positions of the first object and the second object 230, which are confirmed by the position confirmation unit 151. The un-parking trace management unit 152 is configured to set an un-parking mode of the vehicle 210 based on the positions of the first object and the second object 230. For example, the un-parking trace management unit 152 may set the un-parking mode as a right angled left front and a right angled right front as illustrated in FIGS. 3A and 3B and set the un-parking mode as a right angled left rear and a right angled right rear as illustrated in FIGS. 3C and 3D. The un-parking trace management unit 152 may set the un-parking mode as a parallel left front and a parallel right front as illustrated in FIGS. 3E and 3F. Although not illustrated, the un-parking trace management unit 152 may also set the un-parking mode as a parallel left rear and a parallel right rear based on the positions of the first object and the second object.

According to the exemplary embodiment of the present disclosure, referring to FIG. 4 as an example, when the second object 230 is positioned at the left front of the vehicle 210 to set the un-parking mode of the vehicle 210 as the right angled left front, the un-parking trace management unit 152 controls a speed of a vehicle to be able to get the vehicle 210 forward. As illustrated in FIG. 4A, when the vehicle 210 goes forward beyond a threshold distance, the un-parking trace management unit 152 may confirm a distance "a" between a first object 220L positioned at the left of the vehicle 210 among first objects 220L and 220R and a left side of the vehicle 210. The un-parking trace management unit 152 may confirm a distance "b" between a rear wheel "A" of the vehicle 210 and a front corner "B" of the first object 220L in the state in which the vehicle 210 goes forward beyond the threshold distance.

The un-parking trace management unit 152 may calculate the un-parking trace based on the distances a and b. As illustrated in FIG. 4B, the un-parking trace management unit 152 may calculate the un-parking trace depending on full turn steering of the vehicle 210 using coordinate values of a target rotating radius "R" of the vehicle and the front corner B of the first object 220L. In more detail, the un-parking trace management unit 152 may calculate the target rotating radius R, which contacts the left side of the vehicle 210 and passes through the front corner B of the first object 220L, using the following Equation 1.

$$R^2 = (x+R)^2 + y^2 \qquad \text{[Equation 1]}$$

In this case, as confirmed in FIG. 4B, a circle generated by the target rotating radius R passes through the front corner B (−a, b) of the first object 220L and therefore a full turn steering time may be calculated based on the following Equation 2.

$$R^2 = (-a+R)^2 + b_{tgt}^2 \qquad \text{[Equation 2]}$$

Where, $b\_tgt^2 = \sqrt{2a^*(2R-a)}$

The un-parking trace management unit 152 may confirm whether the vehicle 210 is un-parked at the calculated full turn steering time as illustrated in FIG. 4C. In this case, as shown, an angle "θ" is formed by a straight line extending from a front of the first object 220L and a straight line extending from the left side of the vehicle 210. The un-parking trace management unit 152 may calculate a distance between the first object 220R positioned at the right of the vehicle 210 and the vehicle 210 to be able to confirm that the vehicle 210 may be un-parked when the distance is long enough to prevent the vehicle 210 from colliding with the first object 220R positioned at the right of the vehicle 210 even though the steering of the vehicle 210 is controlled at the calculated full turn steering time.

The un-parking management unit 153 controls the steering and speed of the vehicle 210 based on the un-parking trace calculated by the un-parking trace management unit 152 to be able to perform the un-parking of the vehicle 210.

According to the exemplary embodiment of the present disclosure, referring to FIG. 5 as an example, when the second object 230 is positioned at the right rear of the vehicle 210 to set the un-parking mode of the vehicle 210 as the right angled right rear, the un-parking trace management unit 152 controls a speed of a vehicle to be able to go the vehicle 210 backward. As illustrated in FIG. 5A, when the vehicle 210 goes backward beyond the threshold distance, the un-parking trace management unit 152 may confirm the distance a between the first object 220L positioned at the left of the vehicle 210 among the first objects 220L and 220R and the left side of the vehicle 210. The un-parking trace management unit 152 is configured to confirm a distance b between the rear wheel A of the vehicle 210 and a rear corner "C" of the first object 220L in the state in which the vehicle 210 goes backward beyond the threshold distance.

The un-parking trace management unit 152 may calculate the un-parking trace based on the distances a and b. As illustrated in FIG. 5B, the un-parking trace management unit 152 may calculate the un-parking trace depending on the full turn steering of the vehicle 210 using coordinate values of the target rotating radius R of the vehicle and the rear corner C of the first object 220L. In more detail, the un-parking trace management unit 152 may calculate the target rotating radius R, which contacts the left side of the vehicle 210 and passes through the rear corner C of the first object 220L, using the following Equation 3.

$$R^2 = (-x - R_{min})^2 + y^2 \quad \text{[Equation 3]}$$

The variable $R_{min}$ is a radius of a circle formed based on a left corner of the rear of vehicle when the vehicle is subjected to the full turn steering and then goes backward.

In this case, as confirmed in FIG. 5B, the vehicle 210 passes through the rear corner C (−a, b) of the first object 220L and therefore the full turn steering time may be calculated based on the following Equation 4.

$$R^2 = (-a - R_{min})^2 + b_{tgt}^2 \quad \text{[Equation 4]}$$

Where, $b\_tgt = \sqrt{R^2 - (a + R_{min})^2}$

The un-parking trace management unit 152 may confirm whether the vehicle 210 is un-parked at the calculated full turn steering time as illustrated in FIG. 5C. In this case, the above θ may be an angle formed by a straight line extending from the rear of the first object 220L and a straight line extending from the right side of the vehicle 210.

The un-parking trace management unit 152 is configured to calculate the distance between the first object 220R positioned at the right of the vehicle 210 and the vehicle 210 to be able to confirm that the vehicle 210 may be un-parked when the distance is a distance enough to prevent the vehicle 210 from colliding with the first object 220R positioned at the right of the vehicle 210 even though the steering of the vehicle is controlled at the calculated full turn steering time.

According to the exemplary embodiment of the present disclosure, referring to FIG. 6 as an example, when the un-parking mode of the vehicle 210 is set as the parallel left front, the un-parking trace management unit 152 may enable the vehicle to go backward after a front wheel FW of the vehicle 210 is subjected to the full turn steering as illustrated in FIG. 6A. As discussed above, wheel A is one of the rear wheels of the vehicle 210. When a distance from the first object 220B sensed by the ultrasonic sensor positioned at the rear of the vehicle 210 is equal to or less than the threshold distance, as illustrated in FIG. 6B, the un-parking trace management unit 152 is configured to perform full turn re-steering on the front wheel FW and enables the vehicle to go forward. In this case, the rear wheel of the vehicle 210 may be changed from A to "A". As illustrated in FIG. 6C, when the rear wheel of the vehicle is changed from A to A' and a distance difference from the rear wheel, for example, a lateral movement amount "d" of the vehicle 210 is equal to or more than a threshold value, the un-parking trace management unit 152 may consider that the un-parking is completed to end the un-parking support.

Figure 7:
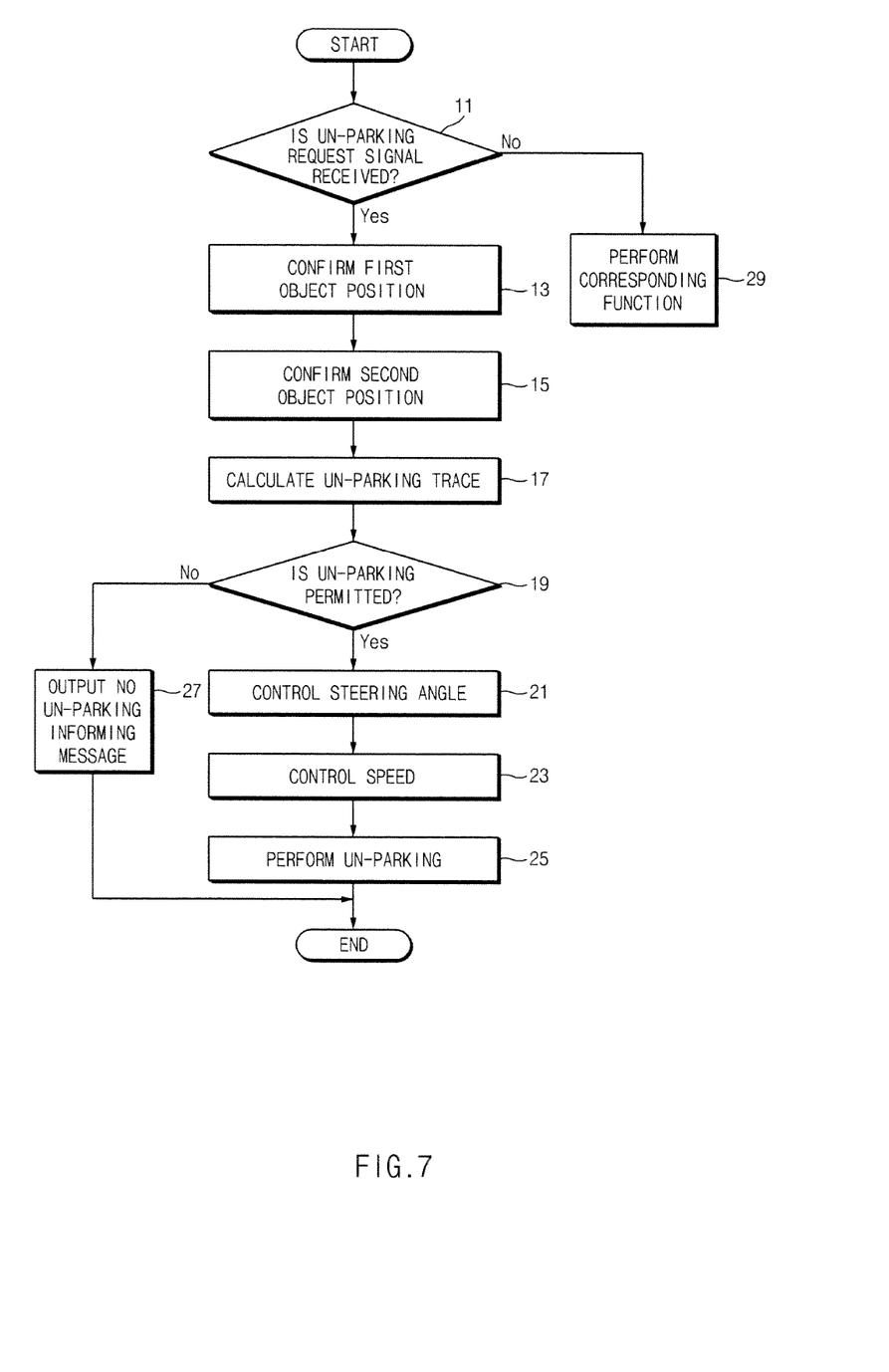
FIG. 7 is a flow chart of an exemplary embodiment of a method for controlling un-parking of a vehicle according to an exemplary embodiment of the present disclosure.

FIG. 7 is a flow chart of an exemplary embodiment of a method for controlling un-parking of a vehicle according to an exemplary embodiment of the present disclosure.

Referring to FIGS. 1 to 7, at step 11, the control module 150 may determine whether the un-parking request signal for the parked vehicle 210 is received from the outside. In step 11, when the un-parking request signal is not received, the control module 150 may proceed to perform the corresponding functions such as un-parking request signal receiving stand-by, at step 29.

In step 11, when the un-parking request signal is received, the control module 150 may proceed to step 13. At step 13, the control module 150 controls the sensor module 120 to be able to confirm the position of at least one first object present around the parked vehicle 210. The first object may be other vehicles, a road hump, and the like which are present around the vehicle.

At step 15, the control module 150 may confirm the position of the second object 230, which is positioned outside the vehicle 210, based on the un-parking request signal for the vehicle received from the sensor module 120. In this case, the second object 230 may be the manipulation devices such as the smart key and the smart phone that provide the un-parking request signal for the vehicle 210, which is the RF signal to the RF receiving sensor (not illustrated) included in the sensor module 120, in which the manipulation devices may be carried and manipulated by the driver. Therefore, the position of the second object may be the position of the driver. The control module 150 may confirm the receiving time at which at least one RF receiving sensor receives the un-parking request signal for the vehicle, respectively.

According to the exemplary embodiment of the present disclosure, the control module 150 may confirm the receiving time t1 of the first RF sensing unit of the RF receiving sensor positioned at the front left of the vehicle 210 and the receiving time t2 of second RF sensing unit of the RF receiving sensor positioned at the front center of the vehicle 210. When t1−t2 is smaller than 0, the control module 150 may estimate that the second object is positioned at the left of the vehicle and when t1−t2 is larger than 0, may estimate that the second object is positioned at the right of the vehicle. The control module 150 may confirm the receiving time t3 of the third RF sensing unit of the RF receiving sensor positioned at the rear center of the vehicle. When t2−t3 is smaller than 0, the control module 150 may estimate that the second object is positioned at the front of the vehicle 210 and when t2−t3 is larger than 0, estimate that the second object is positioned at the rear of the vehicle 210.

At step 17, the control module 150 may generate the un-parking trace of the vehicle 210 based on the confirmed positions of the first object and the second object. The control module 150 may set the un-parking mode of the vehicle 210 based on the positions of the first object and the second object and thus may generate the un-parking trace. The un-parking mode of the vehicle 210 may include any one of right angled un-parking and parallel un-parking and an un-parking kind for any one of the left front, the left rear, the right front, and the right rear depending on the un-parking method.

According to the exemplary embodiment of the present disclosure, when it is confirmed that the first object is positioned at the left and right of the vehicle 210, respectively and the first object such as a road hump is positioned at the rear of the vehicle 210, the control module 150 may set the un-parking method to perform the right angled un-parking. Further, when it is confirmed that the second object is positioned at the left front of the vehicle 210, the control module 150 performs the right angled un-parking but may set the un-parking mode of the vehicle 210 as the right angled left front to un-park the vehicle 210 in the left front. When the set un-parking mode is the right angled left front, the control module 150 may confirm the distances from the first objects positioned on the side of the vehicle 210 and at the left of the vehicle 210. The control module 150 may confirm distances from the rear wheel of the vehicle 210 and the front corner of the first object positioned at the left of the vehicle 210. The control module 150 may calculate the un-parking trace of the vehicle 210 based on the confirmed two distances. The calculation of the un-parking trace is described in detail based on the above Equations 1 and 2 and therefore the description thereof will be omitted.

According to the exemplary embodiment of the present disclosure, when it is confirmed that the first object is positioned at the left and right of the vehicle 210, respectively and the first object such as a road hump is positioned at the front of the vehicle, the control module 150 may set the un-parking method to perform the right angled un-parking. Further, when it is confirmed that the second object is positioned at the right rear of the vehicle 210, the control module 150 performs the right angled un-parking but may set the un-parking mode of the vehicle 210 as the right angled right rear to un-park the vehicle in the right rear. When the set un-parking mode is the right angled right rear, the control module 150 may confirm the distances from the first objects positioned on the side of the vehicle 210 and at the left of the vehicle 210. The control module 150 may confirm distances from the rear wheel of the vehicle 210 and the rear corner of the first object positioned at the left of the vehicle 210. The control module 150 may calculate the un-parking trace of the vehicle 210 based on the confirmed two distances. The calculation of the un-parking trace is described in detail based on the above Equations 3 and 4 and therefore the description thereof will be omitted.

According to the exemplary embodiment of the present disclosure, the first objects are each positioned at the front/rear of the vehicle 210 and the control module 150 may set the un-parking method to perform the parallel un-parking. In this case, the control module 150 may also confirm whether the first object is present at either of the left or the right of the vehicle 210. Further, when it is confirmed that the second object is positioned at the left front of the vehicle 210, the control module 150 performs the parallel un-parking but may set the un-parking mode of the vehicle as the parallel left front to un-park the vehicle in the left front.

At step 19, the control module 150 controls the un-parking of the vehicle 210 based on the calculated un-parking trace to be able to confirm whether the vehicle 210 may be un-parked without contacting the first object. As the confirmation result in step 19, when the vehicle may not be un-parked, the control module 150 may proceed to step 27. At step 27, the control module 150 may output the no un-parking informing message. In this case, the message may be output through a speaker SPK, which is equipped in the vehicle 210 and may be output by various methods such as turning on/off of the lamp having a predetermined pattern.

At step 19, when the vehicle 210 may be un-parked, the control module 150 may proceed to step 21. At step 21, the control module 150 may control a wheel steering depending on a steering angle calculated in step 17 and in step 23, the control module 150 may control a speed required to un-park the vehicle 210. At step 25, the control module 150 may complete the un-parking of the vehicle 210 based on the control of the steering angle and the speed.

As described above, according to the apparatus and method for controlling un-parking of a vehicle in accordance with the exemplary embodiments of the present disclosure, it is possible to un-park the vehicle to the position where the driver conveniently boards the vehicle and minimize the occurrence of the collision with other vehicles during the un-parking by confirming objects around the vehicle using at least one sensor equipped in the vehicle and confirming the position of the driver based on the position of the manipulation device generating the un-parking request signal.

The exemplary embodiments of the present disclosure disclosed in the present specification and the accompanying drawings have been provided only as specific examples in order to assist in understanding the present disclosure and do not limit the scope of the present disclosure. Therefore, it is to be understood that in addition to the exemplary embodiments of the present disclosure described herein, all the changed or modified forms derived from the technical spirit of the present disclosure are included in the scope of the present disclosure.

What is claimed is:

1. An apparatus for controlling un-parking of a vehicle, comprising:
    a sensor module, including at least two sensors that receive an un-parking request signal for a parked vehicle, that determines whether a first object around the vehicle is present; and
    a controller determining a position of a second object based on a position of a user of the vehicle relative to the vehicle and determining an un-parking mode for the vehicle depending on the positions of the first object and the second object to control the un-parking of the vehicle,
    wherein the controller sets the un-parking mode, including an un-parking kind selected from among left front, left rear, right front, and right rear, and including an un-parking method selected from among right angled un-parking and parallel un-parking, based on the positions of the first object and of the second object, and
    wherein the controller determines the position of the second object based on receiving times of the un-parking request signal received at each of the at least two sensors.

2. The apparatus according to claim 1, wherein the second object is positioned outside the vehicle to generate the un-parking request signal.

3. The apparatus according to claim 1, wherein the controller calculates an un-parking trace of the vehicle based on the positions of the first object and the second object and the un-parking mode.

4. The apparatus according to claim 3, wherein the controller determines a first distance between a side of the vehicle and the first object and determines a second distance between a rear wheel of the vehicle and a front corner of the first object to calculate the un-parking trace of the vehicle, when an un-parking mode is set as any one of a right angled left front and a right angled right front.

5. The apparatus according to claim 3, wherein the controller determines a third distance between a side of the vehicle and the first object and determines a fourth distance between a rear wheel of the vehicle and a rear corner of the first object to calculate the un-parking trace of the vehicle, when an un-parking mode is set as any one of a right angled left rear and a right angled right rear.

6. The apparatus according to claim 3, wherein the controller controls a steering angle and a speed of the vehicle depending on the un-parking trace to perform the un-parking of the vehicle.

7. A method for controlling un-parking of a vehicle, comprising:
   receiving, using a sensor module including at least two sensors, an un-parking request signal for a parked vehicle;
   determining, by a controller coupled to the sensor module, whether a first object around the vehicle is present;
   determining, by the controller based on receiving times of the un-parking request signal received at each of the at least two sensors, a position of a second object based on a position of a user of the vehicle relative to the vehicle;
   determining, by the controller, an un-parking mode for the vehicle depending on the positions of the first object and the second object; and
   performing the un-parking of the vehicle by controlling steering and speed of the vehicle by the controller,
   wherein the determination of the un-parking mode for the vehicle includes setting the un-parking mode, including an un-parking kind selected from among left front, left rear, right front, and right rear, and including an un-parking method selected from among right angled un-parking and parallel un-parking, based on the positions of the first object and of the second object.

8. The method according to claim 7, wherein the receiving of the un-parking request signal includes receiving the un-parking request signal generated from the second object positioned outside the vehicle.

9. The method according to claim 7, wherein the determination of the position of the second object further includes confirming the receiving times of the un-parking request signal received by each of the at least two sensors.

10. The method according to claim 7, wherein the performing of the un-parking of the vehicle further includes calculating an un-parking trace of the vehicle based on the positions of the first object and the second object and the un-parking mode.

11. The method according to claim 10, wherein the calculating of the un-parking trace of the vehicle includes determining a first distance between a side of the vehicle and the first object and determining a second distance between a rear wheel of the vehicle and a front corner of the first object to calculate the un-parking trace of the vehicle, when an un-parking mode of the vehicle is set as any one of a right angled left front and a right angled right front.

12. The method according to claim 10, wherein the calculating of the un-parking trace of the vehicle includes determining a third distance between a side of the vehicle and the first object and determining a fourth distance between a rear wheel of the vehicle and a rear corner of the first object to calculate the un-parking trace of the vehicle, when an un-parking mode of the vehicle is set as any one of a right angled left rear and a right angled right rear.

13. The method according to claim 10, wherein the performing of the un-parking of the vehicle includes controlling a steering angle and a speed of the vehicle depending on the un-parking trace to perform the un-parking of the vehicle.

* * * * *